(12) United States Patent
Hsu et al.

(10) Patent No.: US 11,554,789 B2
(45) Date of Patent: Jan. 17, 2023

(54) DRIVING ASSISTANT METHOD, VEHICLE, AND STORAGE MEDIUM

(71) Applicant: Chiun Mai Communication Systems, Inc., New Taipei (TW)

(72) Inventors: Chih-Pu Hsu, New Taipei (TW);
Jian-Cheng Lin, New Taipei (TW);
Pei-Lin Chen, New Taipei (TW);
Tsung-Chun Tseng, New Taipei (TW);
Chien-Chun Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 298 days.

(21) Appl. No.: 17/067,727

(22) Filed: Oct. 11, 2020

(65) Prior Publication Data
US 2021/0107508 A1  Apr. 15, 2021

(30) Foreign Application Priority Data
Oct. 11, 2019  (CN) .......................... 201910961142.7

(51) Int. Cl.
*B60Q 1/00* (2006.01)
*B60W 50/14* (2020.01)
(Continued)

(52) U.S. Cl.
CPC ............ *B60W 50/14* (2013.01); *B60W 30/16* (2013.01); *B60W 40/13* (2013.01); *G06V 20/584* (2022.01);
(Continued)

(58) Field of Classification Search
CPC ...... B60W 50/14; B60W 30/16; B60W 40/13; B60W 2050/143; B60W 2050/146;
(Continued)

(56) References Cited

U.S. PATENT DOCUMENTS 5,948,035 A * 9/1999 Tomita .................... B60T 8/172
701/79
9,870,708 B2 * 1/2018 Chandran ............ G08G 1/0175
(Continued)

FOREIGN PATENT DOCUMENTS

| CN | 101131321 A | 2/2008 |
| CN | 104966049 A | 10/2015 |
| CN | 105632218 A | 6/2016 |

*Primary Examiner* — Toan N Pham
(74) *Attorney, Agent, or Firm* — ScienBiziP, P.C.

(57) ABSTRACT

A method for providing assistance in driving includes capturing an image of a second moving vehicle when a first moving vehicle is moving and obtaining basic information of the second moving vehicle according to the image thereof, the basic information of the second moving vehicle comprising weight information of the second moving vehicle. Driving information of the first moving vehicle is obtained, and a safe distance between the first moving vehicle and the second moving vehicle is determined according to the driving information of the first moving vehicle and the basic information of the second moving vehicle. The current distance between the first moving vehicle and the second moving vehicle is detected, and a warning is output if the distance between the first moving vehicle and the second moving vehicle is less than the safe distance.

20 Claims, 4 Drawing Sheets

(51) Int. Cl.
*B60W 30/16* (2020.01)
*B60W 40/13* (2012.01)
*G06V 20/58* (2022.01)
*G06V 20/62* (2022.01)

(52) U.S. Cl.
CPC . *B60W 2050/143* (2013.01); *B60W 2050/146* (2013.01); *B60W 2420/52* (2013.01); *B60W 2420/54* (2013.01); *B60W 2554/802* (2020.02); *G06V 20/625* (2022.01)

(58) Field of Classification Search
CPC ......... B60W 2420/52; B60W 2420/54; B60W 2554/802; B60W 2420/42; B60W 2554/404; G06V 20/584; G06V 20/625; G06V 10/751; G06V 20/58; G06V 20/63; G08G 1/161; G08G 1/16; B60Q 9/00
See application file for complete search history.

(56) References Cited

U.S. PATENT DOCUMENTS

| | | | |
|---|---|---|---|
| 2006/0273922 | A1 | 12/2006 | Bhogal et al. |
| 2007/0154068 | A1* | 7/2007 | Stein .................... G01B 11/026 348/148 |
| 2017/0263128 | A1 | 9/2017 | Chandran |
| 2019/0100198 | A1* | 4/2019 | Hakki .................... G08G 1/167 |
| 2021/0224560 | A1* | 7/2021 | Kim ....................... G08G 1/166 |

\* cited by examiner

| Distance reference table | |
|---|---|
| Safe distance (m) | Driving speed of the first vehicle (km/h) |
| Weight information of the second vehicle (ton) | less than 60 | 60-70 | 70-80 | 80-90 | 90-100 | ... |
| less than 3 | 30 | 40 | 50 | 60 | 70 | ... |
| 3-10 | 40 | 50 | 60 | 70 | 80 | ... |
| greater than 10 | 50 | 60 | 70 | 80 | 90 | ... |

DRIVING ASSISTANT METHOD, VEHICLE, AND STORAGE MEDIUM

CROSS-REFERENCE TO RELATED APPLICATIONS

This application claims priority to Chinese Patent Application No. 201910961142.7 filed on Oct. 11, 2020, the contents of which are incorporated by reference herein.

FIELD

The subject matter herein generally relates to road safety in driving.

BACKGROUND

Traffic accidents happen all the time. Most traffic accidents are caused by not keeping a safe distance between two vehicles. A driver generally estimates a distance between two vehicles and adjusts a vehicle speed according to the estimated distance. However, the estimating of the distance between two vehicles may not be precise, many factors can affect the estimation of a safe distance. Factors such as road conditions during the operation of the vehicle may also affect the estimation of distance and a safe vehicle speed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

Figure 1:
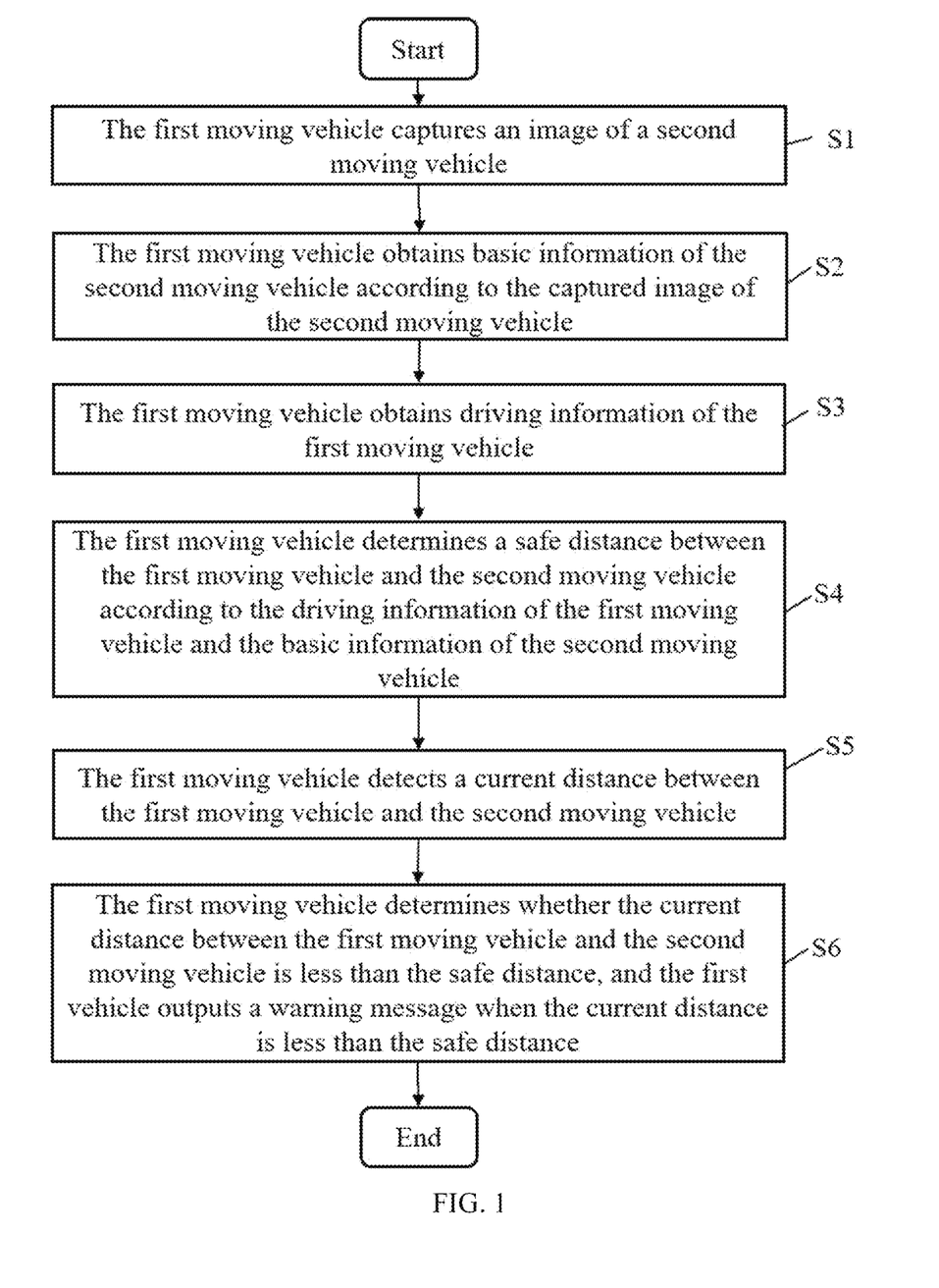
FIG. 1 illustrates a flowchart of one embodiment of a driving assistant method of the present disclosure.

FIG. 1 illustrates a flowchart of a driving assistant method.

Figure 4:
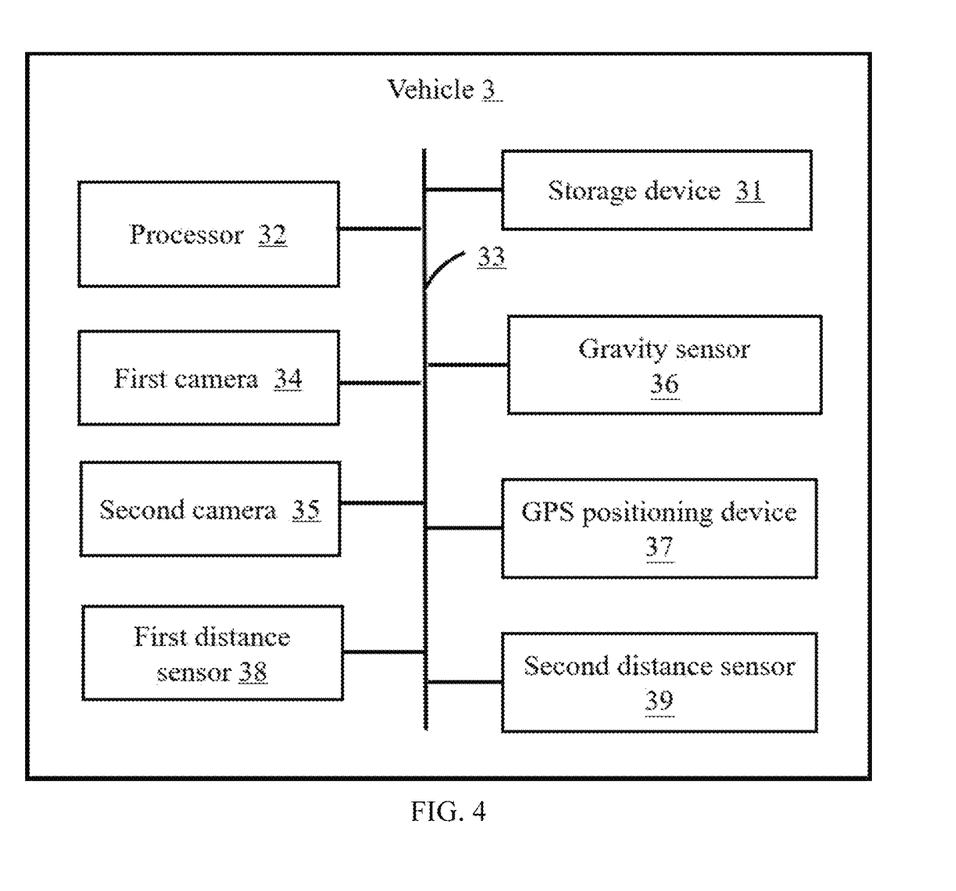
FIG. 4 shows s a schematic block diagram of one embodiment of a vehicle of the present disclosure.

In one embodiment, the driving assistant method can be applied to a vehicle (e.g., a vehicle 3 in FIG. 4). For a vehicle that needs to perform a driving assistant, the function for the driving assistant provided by the method of the present disclosure can be directly integrated on the vehicle, or run on the vehicle in the form of a software development kit (SDK). Referring to FIG. 4, the vehicle 3 can include, but is not limited to, a storage device 31, at least one processor 32, at least one communication bus 33, a first camera 34, a second camera 35, a gravity sensor 36, a Global Positioning System (GPS) positioning device 37, a first distance sensor 38, and a second distance sensor 39. The above components communicate with each other through the at least one communication bus 33.

Referring to FIG. 1, the method is provided by way of example, as there are a variety of ways to carry out the method. Each block shown in FIG. 1 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

This embodiment applies the driving assistance method to a first moving vehicle, for effectively controlling the distance between the first moving vehicle and a second moving vehicle for safety, as an example.

At block S1, the first moving vehicle captures an image of a second moving vehicle.

In this embodiment, the captured image includes a license plate number of the second moving vehicle. The captured image can be a video or a photo.

In this embodiment, the second moving vehicle is a vehicle driving in front of the first moving vehicle or a vehicle driving behind the first moving vehicle.

In at least one embodiment, the first camera 34 can be installed at the front of the first moving vehicle, and the second camera 35 can be installed at the rear of the first moving vehicle, so that when the second moving vehicle is driving at the front of the first moving vehicle, the first moving vehicle can use the first camera 34 to capture image of the second moving vehicle. When the second moving vehicle is behind the first moving vehicle, the first moving vehicle can use the second camera 35 to capture image of the second moving vehicle.

At block S2, the first moving vehicle obtains basic information of the second moving vehicle according to the captured image of the second moving vehicle. In one embodiment, the basic information of the second moving vehicle includes weight information of the second moving vehicle.

In one embodiment, the first moving vehicle obtains basic information of the second moving vehicle according to the image of the second moving vehicle includes:

(a1) identifying the license plate number of the second moving vehicle according to the captured image.

For example, intercepting at least one frame of picture from the captured image, and identifying the license plate number of the second moving vehicle by optical character recognition technology If the captured image is a photo, there can be direct identification of the license plate number of the second moving vehicle from the photo by the optical character recognition technology.

(a2) obtaining the weight information of the second moving vehicle by searching a first database according to the license plate number of the second moving vehicle. The weight information of each vehicle and the license plate number of corresponding of each vehicle are stored in the first database.

In at least one embodiment, the first moving vehicle can search the first database through networking. The first database can be stored in a cloud server.

In at least one embodiment, the weight information of the second moving vehicle may be a maximum load of the second moving vehicle, or the weight information of the second moving vehicle is the weight of the second moving vehicle recorded during the last occasion of weighing.

In this embodiment, the "weighing" may refer to the weight recorded by a weighing device in accordance with the regulations of the Traffic Management Bureau.

In another embodiment, the weight information of the second moving vehicle is the maximum load of the second moving vehicle. The first moving vehicle obtains basic information of the second moving vehicle according to the image of the second moving vehicle includes steps (c1) to (c4):

(c1) identifying an area of the second moving vehicle and an area of the license plate of the second moving vehicle from the captured image. To clearly describe the disclosure, hereinafter the area of the second moving vehicle from the captured image is referred to as "first area", and hereinafter the area of the license plate of the second moving vehicle from the captured image is referred to as "second area".

In one embodiment, the identifying the first area includes: identifying the second moving vehicle from the captured image using a preset image recognition algorithm, such as a template matching method. The identifying of the second area includes: identifying the license plate of the second moving vehicle from the captured image using a preset image recognition algorithm, such as a template matching method.

(c2) calculating a size of the first area and a size of the second area. To clearly describe the disclosure, hereinafter the size of the first area is referred to as "first size", and hereinafter the size of the second area is referred to as "second size".

In this embodiment, the first size can be calculated through a total number of pixels in the first area, and the second size can be calculated through a total number of pixels in the second area.

(c3) calculating a current ratio between the first size and the second size.

Figure 2A:
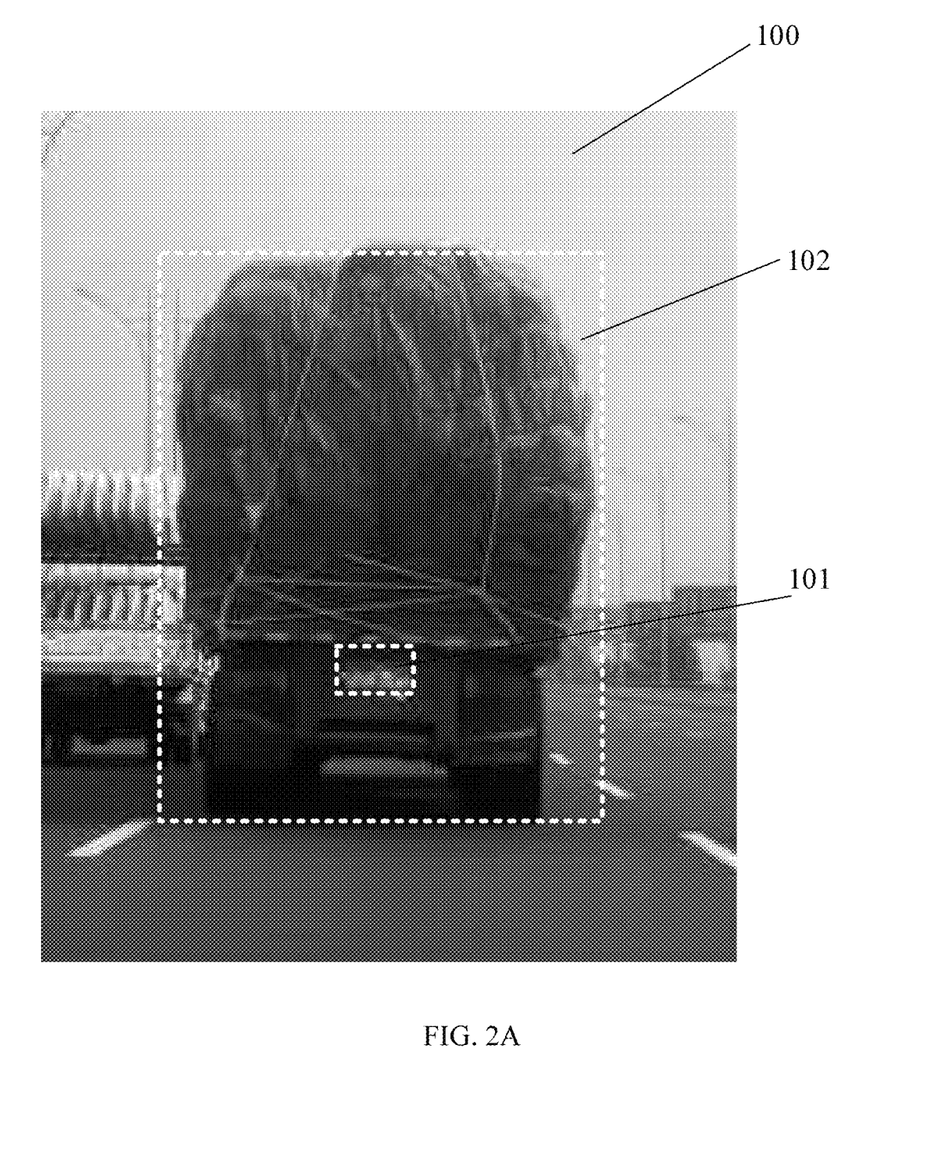
FIG. 2A illustrates an area of a license plate and an area of a vehicle of an image.

For example, image 100 of FIG. 2A shows a captured image of the second moving vehicle. The first area is identified as 102, and the second area is identified as 101. Then, the current ratio between the first size and the second size is equal to a ratio between a total number of pixels in the first area 102 and a total number of pixels in the second area 101.

If the total number of pixels in the first area 102 is A, the total number of pixels in the second area 101 is B. Then, the current ratio between the first size and the second size is A:B.

(c4) determining a type of the second moving vehicle according to the current ratio and obtaining the weight of the second moving vehicle according to the determined type of the second moving vehicle.

In one embodiment, types of vehicles may be large vehicles, medium vehicles, and small vehicles.

In one embodiment, the first moving vehicle pre-establishes a second database. The second database records a first relationship between a standard size of each type of vehicle and a standard size of the license plate of the each type of vehicle, and a second relationship between a standard size of each type of vehicle and a maximum load of the each type of vehicle. In other embodiments, the second database can be prestored in a cloud server.

In one embodiment, the determining of a type of the second moving vehicle according to the ratio and obtaining the weight of the second moving vehicle according to the determined type of the second moving vehicle includes steps (c41) to (c43):

(c41) calculating a standard ratio between the standard size of each type of vehicle and the standard size of the license plate of each type of vehicle which are recorded in the second database and obtaining several standard ratios.

(c412) determining the type of the second moving vehicle by matching the current ratio and the standard ratios.

For example, if the current ratio is matching with one of the standard ratios, setting the type of the second moving vehicle as the type corresponding to the one of the standard ratios in the second database. If an absolute difference between the current ratio and the one of the standard ratios is within a predetermined range, it is determined that the current ratio is matching with the one of the standard ratios.

(c43) determining a maximum load of the second moving vehicle from the second database according to the determined type of the second moving vehicle, and obtaining the weight of the second moving vehicle based on the maximum load of the second moving vehicle (that is the weight of the second moving vehicle is equal to the maximum load of the second moving vehicle).

At block S3, the first moving vehicle obtains driving information of the first moving vehicle. In one embodiment, the driving information of the first moving vehicle can include, but is not limited to, a driving speed of the first moving vehicle, a slope of a road on which the first moving vehicle is currently located, and a load of the first moving vehicle. The load of the first moving vehicle can be a maximum load of the first moving vehicle.

In one embodiment, the first moving vehicle can use a speed sensor installed in the first moving vehicle to obtain the driving speed of the first moving vehicle. In other embodiments, the first moving vehicle may also use the GPS positioning device 37 installed on the first moving vehicle to obtain the driving speed of the first moving vehicle. It should be noted that the global positioning system uses navigation satellites for timing, positioning, and ranging, which can provide users with real-time and high-precision three-dimensional space, speed and time information throughout the world, and it is an existing technology.

In this embodiment, the first moving vehicle may use any method of calculating the slope of the road in the prior art to obtain the slope of the road where the first moving vehicle is currently located. For example, the first moving vehicle may use the gravity sensor 36 installed in the first moving vehicle to obtain the slope of the road where the first moving vehicle is currently located. In an embodiment, the slope of the road where the first moving vehicle is currently located may be uphill, flat, and downhill.

In an embodiment, the load of the first moving vehicle may be stored in the first moving vehicle in advance, that is, the load of the first moving vehicle is always previously known.

At block S4, the first moving vehicle determines a safe distance between the first moving vehicle and the second moving vehicle according to the driving information of the first moving vehicle and the basic information of the second moving vehicle.

In one embodiment, the first moving vehicle pre-stores a distance reference table in advance, and the distance reference table records a relationship between the driving information, the basic information, and the safe distance. The first moving vehicle may determine the safe distance between the first moving vehicle and the second moving vehicle by searching the distance reference table according to the driving information of the first moving vehicle and the basic information of the second moving vehicle.

Figure 2B:
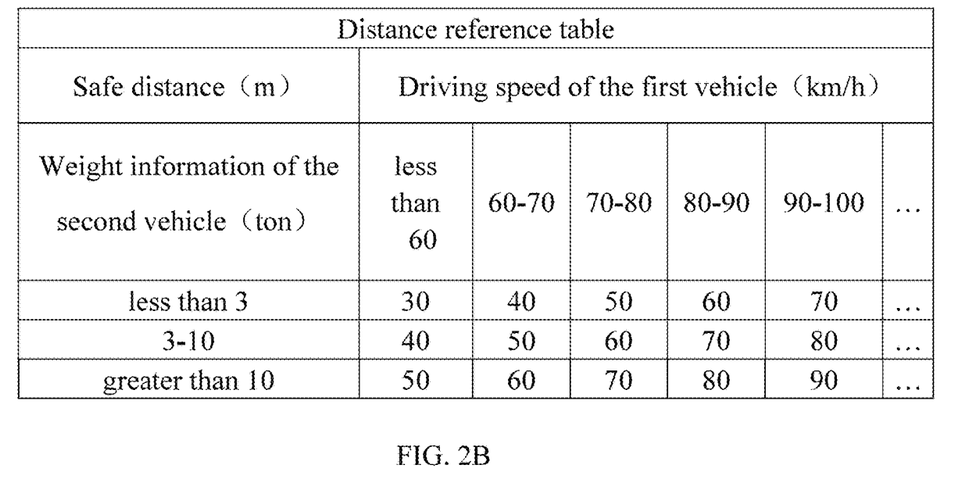
FIG. 2B illustrates a safe distance reference table.

The driving information of the first moving vehicle may include only the driving speed, and the basic information of the second moving vehicle may include only the wight of the second moving vehicle. Referring to FIG. 2B, when the current driving speed of the first moving vehicle is 65 km/h, and the weight of the second moving vehicle is 5 tons, the safe distance between the first moving vehicle and the second moving vehicle can be determined to be 50 meters.

It should be noted that the distance reference table illustrated in FIG. 2B is only an example and is not to be interpreted as a limitation of the present disclosure.

At block S5, the first moving vehicle detects a current distance between the first moving vehicle and the second moving vehicle.

In one embodiment, the first distance sensor 38 may be installed at the front of the first moving vehicle, and the first distance sensor 38 may be an ultrasonic sensor or a radar. A second distance sensor 39 may be installed at the rear of the first moving vehicle, and the second distance sensor 39 may be an ultrasonic sensor or a radar. When the second moving vehicle is driving in front of the first moving vehicle, the first moving vehicle can use the first distance sensor 38 to detect the distance between the first moving vehicle and the second moving vehicle. When the second moving vehicle is driving behind the first moving vehicle, the first moving vehicle can use the second distance sensor 39 to detect the distance between the first moving vehicle and the second moving vehicle.

At block S6, the first moving vehicle determines whether the distance between the first moving vehicle and the second moving vehicle is less than a safe distance. The first moving vehicle outputs a warning message when the distance between the first moving vehicle and the second moving vehicle is less than the safe distance.

In one embodiment, the outputting of the warning message may include: displaying a predetermined text message on a display of the first moving vehicle to remind a driver of the first moving vehicle to keep safe distance; and/or controlling a speaker of the first moving vehicle to issue an audible warning.

In summary, the driving assistant method described in the embodiment can calculate the safe distance according to the real-time operating conditions of the vehicle during driving, and provide driving prompts according to the safe distance, thereby effectively improving driving safety.

The above-mentioned FIG. 1 describes in detail the driving assistant method of the present disclosure. The following describes several functional modules of the software device for implementing the assistant method and the hardware device architecture for implementing the driving assistant method with reference to FIG. 3 and FIG. 4.

It should be understood that the described embodiments are for illustrative purposes only, and are not limited by this structure in the scope of the patent application.

Figure 3:
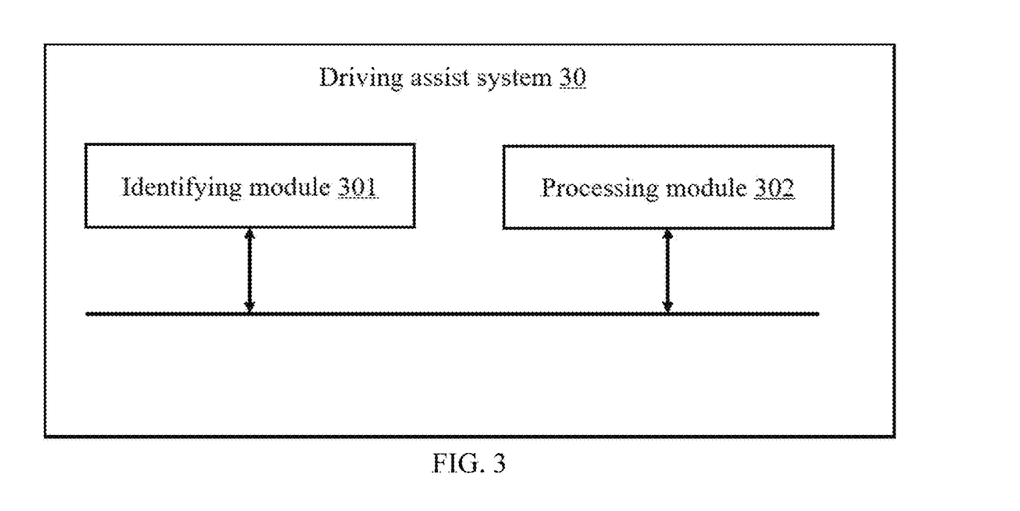
FIG. 3 shows schematic block diagram of one embodiment of modules of a driving assistant system of the present disclosure.

FIG. 3 is a schematic structural diagram of a preferred embodiment of a driving assist system of the present disclosure.

In some embodiments, the driving assistant system 30 runs in a vehicle (e.g., the first moving vehicle or the second moving vehicle). The driving assistant system 30 can include a plurality of function modules consisting of program code segments. The program code of each program code segments in the driving assistant system 30 can be stored in a memory (e.g., a storage device 31 in FIG. 4) and executed by at least one processor (e.g., a processor 32 in FIG. 4) to perform driving assist function.

In the embodiment, the driving assistant system 30 can be divided into a plurality of functional modules, according to the performed functions. The functional modules can include: an identifying module 301, and a processing module 302. A module as referred to in the present disclosure refers to a series of computer-readable instruction segments that can be executed by at least one processor and that are capable of performing fixed functions, which are stored in a memory. In some embodiment, the functions of each module will be detailed in the following embodiments.

In the present disclosure, this embodiment takes the driving assistant system 30 running on the first moving vehicle as an example.

The identifying module 301 captures an image of a second moving vehicle.

In this embodiment, the captured image includes a license plate number of the second moving vehicle. The captured image can be a video or a photo.

In this embodiment, the second moving vehicle is a vehicle driving in front of the first moving vehicle or a vehicle following behind the first moving vehicle.

In at least one embodiment, a first camera 34 can be installed at the front of the first moving vehicle, and a second camera 35 can be installed at the rear of the first moving vehicle, so that when the second moving vehicle is driving at the front of the first moving vehicle, the identifying module 301 can use the first camera 34 to capture the image of the second moving vehicle. When the second moving vehicle is driving behind the first moving vehicle, the identifying module 301 can use the second camera 35 to capture the image of the second moving vehicle.

The processing module 302 obtains basic information of the second moving vehicle according to the image of the second moving vehicle. In one embodiment, the basic information of the second moving vehicle includes weight information of the second moving vehicle.

In one embodiment, the first moving vehicle obtaining basic information of the second moving vehicle according to the image of the second moving vehicle includes:

(a1) identifying the license plate number of the second moving vehicle according to the captured image.

For example, intercepting at least one frame of picture from the captured image, and identifying the license plate number of the second moving vehicle by optical character recognition technology It should be noted that if the captured image is a photo, identifying the license plate number of the second moving vehicle from the photo by the optical character recognition technology directly.

(a2) obtaining the weight information of the second moving vehicle by searching for a first database according to the license plate number of the second moving vehicle. The weight information of each vehicle and the license plate number of corresponding of each vehicle are stored in the first database.

In at least one embodiment, the processing module 302 can search the first database through networking. The first database can be stored in a cloud server.

In at least one embodiment, the weight information of the second moving vehicle is a maximum load of the second moving vehicle, or the weight information of the second moving vehicle is the weight of the second moving vehicle recorded during a last weighing.

In this embodiment, the "weighing" may refer to the weight recorded on a weighing device in accordance with the regulations of the Traffic Management Bureau.

In another embodiment, the weight information of the second moving vehicle is the maximum load of the second moving vehicle. The first moving vehicle obtains basic information of the second moving vehicle according to the image of the second moving vehicle and includes steps (c1) to (c4):

(c1) identifies an area of the second moving vehicle and an area of the license plate of the second moving vehicle from the captured image. To clearly describe the disclosure, hereinafter the area of the second moving vehicle from the captured image is referred to as "first area", and hereinafter the area of the license plate of the second moving vehicle from the captured image is referred to as "second area".

In one embodiment, the identifying the first area includes: identifying the second moving vehicle from the captured image using a preset image recognition algorithm, such as a template matching method. The identifying the second area includes: identifying the license plate of the second moving vehicle from the captured image using a preset image recognition algorithm, such as a template matching method.

(c2) calculating a size of the first area and a size of the second area. To clearly describe the disclosure, hereinafter the size of the first area is referred to as "first size", and hereinafter the size of the second area is referred to as "second size".

In this embodiment, the first size can be calculated through a total number of pixels in the first area, and the second size can be calculated through a total number of pixels in the second area.

(c3) calculating a current ratio between the first size and the second size.

For example, image 100 of FIG. 2A is the captured image of the second moving vehicle. The first area is 102, and the second area is 101. Then, the current ratio between the first size and the second size is equal to a ratio between a total number of pixels in the first area 102 and a total number of pixels in the second area 101.

If the total number of pixels in the first area 102 is A, the total number of pixels in the second area 101 is B. Then, the current ratio between the first size and the second size is A:B.

(c4) determining a type of the second moving vehicle according to the current ratio and obtaining the weight of the second moving vehicle according to the determined type of the second moving vehicle.

In one embodiment, types of vehicles may be large vehicles, medium vehicles, and small vehicles.

In one embodiment, the processing module 302 establishes a second database. The second database records a first relationship between a standard size of each type of vehicle and a standard size of the license plate of each type of vehicle, and a second relationship between a standard size of each type of vehicle and the maximum load of each type of vehicle. In other embodiments, the second database can be prestored in a cloud server.

In one embodiment, the determining a type of the second moving vehicle according to the ratio and obtaining the weight of the second moving vehicle according to the determined type of the second moving vehicle includes steps (c41) to (c43):

(c41) calculating a standard ratio between the standard size of each type of vehicle and the standard size of the license plate of each type of vehicle that is recorded in the second database and obtaining several standard ratios.

(c412) determining the type of the second moving vehicle by matching the current ratio and the standard ratios.

For example, if the current ratio is matching with one of the standard ratios, setting the type of the second moving vehicle as the type corresponding to the one of the standard ratios in the second database. If an absolute difference between the current ratio and the one of the standard ratios is within a predetermined range, it is determined that the current ratio is matching with the one of the standard ratios.

(c43) determining a maximum load of the second moving vehicle from the second database according to the determined type of the second moving vehicle, and obtaining the weight of the second moving vehicle based on the maximum load of the second moving vehicle (that is the weight of the second moving vehicle is equal to the maximum load of the second moving vehicle).

The processing module 302 obtains driving information of the first moving vehicle. In one embodiment, the driving information of the first moving vehicle can include, but is not limited to, a driving speed of the first moving vehicle, a slope of a road on which the first moving vehicle is currently located, and a load of the first moving vehicle. The load of the first moving vehicle can be a maximum load of the first moving vehicle.

In one embodiment, the processing module 302 can use a speed sensor installed in the first moving vehicle to obtain the driving speed of the first moving vehicle. In other embodiments, the first moving vehicle may also use the GPS positioning device 37 installed on the first moving vehicle to obtain the driving speed of the first moving vehicle. It should be noted that the global positioning system uses navigation satellites for timing, positioning, and ranging, which can provide users with real-time and high-precision three-dimensional space, speed and time information throughout the world, and it is an existing technology.

In this embodiment, the processing module 302 may use any method of calculating the slope of the road in the prior art to obtain the slope of the road where the first moving vehicle is currently located. For example, the first moving vehicle may use the gravity sensor 36 installed in the first moving vehicle to obtain the slope of the road where the first moving vehicle is currently located. In an embodiment, the slope of the road where the first moving vehicle is currently located may be uphill, flat, and downhill.

In an embodiment, the load of the first moving vehicle may be stored in the first moving vehicle in advance, that is, the load of the first moving vehicle is a previously-known number.

The processing module 302 determines a safe distance between the first moving vehicle and the second moving vehicle according to the driving information of the first moving vehicle and the basic information of the second moving vehicle.

In one embodiment, the processing module 302 pre-stores a distance reference table in advance, and the distance reference table records a relationship between the driving information, the basic information, and the safe distance. The processing module 302 may determine the safe distance between the first moving vehicle and the second moving vehicle by searching the distance reference table according to the driving information of the first moving vehicle and the basic information of the second moving vehicle.

In order to explain the present disclosure clearly and simply, it is assumed that the driving information of the first moving vehicle only includes the driving speed, and the basic information of the second moving vehicle only includes the weight of the second moving vehicle. Referring to FIG. 2B, when the current driving speed of the first moving vehicle is 65 km/h, and the weight of the second moving vehicle is 5 tons, the safe distance between the first moving vehicle and the second moving vehicle can be determined to be 50 meters.

It should be noted that the distance reference table illustrated in FIG. 2B is only an example and is not to be interpreted as a limitation.

The processing module 302 detects a distance between the first moving vehicle and the second moving vehicle.

In one embodiment, a first distance sensor 38 may be installed at the front of the first moving vehicle, and the first distance sensor 38 may be an ultrasonic sensor or a radar. A second distance sensor 39 may be installed at the rear of the first moving vehicle, and the second distance sensor 39 may be an ultrasonic sensor or a radar. When the second moving vehicle is driving in front of the first moving vehicle, the first moving vehicle can use the first distance sensor 38 to detect the distance between the first moving vehicle and the second moving vehicle. When the second moving vehicle is driving behind the first moving vehicle, the first moving vehicle can use the second distance sensor 39 to detect the distance between the first moving vehicle and the second moving vehicle.

The processing module 302 determines whether the current distance between the first moving vehicle and the second moving vehicle is less than the safe distance. The first moving vehicle outputs a warning message when the distance between the first moving vehicle and the second moving vehicle is less than the safe distance.

In one embodiment, outputting the warning message may include: displaying a predetermined text message on a display of the first moving vehicle to remind a driver of the first moving vehicle to keep safe distance; and/or controlling a speaker of the first moving vehicle to issue an audible warning.

In summary, the driving assistant system described in the embodiment calculates the safe distance according to the real-time operating conditions of the vehicle during driving, and provides prompts according to the safe distance, thereby effectively improving driving safety.

FIG. 4 is a schematic structural diagram of one embodiment of a vehicle. Depending on the embodiment, the vehicle 3 can include, but is not limited to, a storage device 31, at least one processor 32, at least one communication bus 33, a first camera 34, a second camera 35, a gravity sensor 36, a GPS positioning device 37, a first distance sensor 38, and a second distance sensor 39. The vehicle 3 may be the first moving vehicle and/or the second moving vehicle.

Those skilled in the art should understand that the structure of the vehicle shown in FIG. 4 does not constitute a limitation of the embodiment. The vehicle 3 may also include more or less other hardware or software than shown, or have different component arrangements. For example, the vehicle may also include communication device such as a WI-FI module and a BLUTTOOTH module.

In some embodiments, the vehicle 3 includes a terminal that can automatically perform numerical calculation and/or information processing according to pre-set or stored instructions. A hardware of the terminal includes but is not limited to a microprocessor, an application specific integrated circuit, and Programming gate arrays, digital processors and embedded devices, etc.

It should be noted that the vehicle 3 is only an example, and other existing or future devices or systems that can be adapted should also be included in the protection scope of the present disclosure and are included here by reference.

In some embodiments, the storage device 31 is used to store computer program codes and various data, such as the driving assistant system 30 installed in the vehicle 3. The storage device 31 may include Read-Only Memory (ROM), Programmable Read-Only Memory (PROM), Erasable Programmable Read-Only Memory (EPROM), One-time Programmable Read-Only Memory (OTPROM), Electronically Erasable Programmable Read-Only Memory (EEPROM), Compact Disc Read-Only Memory (CD-ROM) or other optical disk storage, magnetic disk storage, magnetic tape storage, or any other non-volatile computer-readable storage medium that can be used to carry or store data.

In some embodiments, the at least one processor 32 may include integrated circuits, for example, may include a single packaged integrated circuit, or may include multiple integrated circuits with the same function or different functions. The at least one processor 32 may include one or a combination of multiple central processing units (CPU), microprocessors, digital processing chips, graphics processors, and various control chips. The at least one processor 32 is the control core (Control Unit) of the vehicle 3, which uses various interfaces and lines to connect the various components of the entire vehicle 3, and by running or executing programs or modules stored in the storage device 31, and call the data stored in the storage device 31 to execute various functions of the vehicle 3 and process data, for example, execute the driving assistant function.

In some embodiments, the at least one communication bus 33 is configured to implement connection and communication between the storage device 31 and the at least one processor 32 and the like.

In some embodiment, the first camera 34 may be installed on the front of the vehicle 3 to take an image of the license plate of the vehicle driving in front of the vehicle 3. The second camera 35 may be installed at the rear of the vehicle 3 and used to capture images of the license plate of a vehicle driving behind the vehicle 3. The gravity sensor 36 can be used to detect the slope of the road where the vehicle 3 is currently located. The GPS positioning device 37 can be used to detect the driving speed of the vehicle 3. The first distance sensor 38 may be installed on the front of the vehicle 3 to sense the distance between the vehicle 3 and the vehicle driving in front of the vehicle 3. The first distance sensor 39 may be an ultrasonic sensor or a radar. The second distance sensor 39 may be installed at the rear of the vehicle 3 for sensing the distance between the vehicle 3 and the vehicle driving behind the vehicle 3. The second distance sensor 39 can be an ultrasonic sensor or a radar.

Although not shown, the vehicle 3 may also include a power source (such as a battery) for supplying power to various components. Preferably, the power source may be connected to the at least one processor 32 through a power management device, so as to provide charging through the power management device. The power management device can provide functions such as charging, discharging, and power management. The power supply may also include one or more DC or AC power supplies, recharging devices, power failure detection circuits, power converters or inverters, power status indicators, and other arbitrary components. The vehicle 3 may also include various sensors, BLUETOOTH module, WI-FI modules, etc., which will not be repeated here.

It should be understood that the described embodiments are for illustrative purposes only, and are not limited by this structure in the scope of the patent application.

The above-mentioned integrated unit implemented in the form of a software function module may be stored in a computer readable storage medium. The above-mentioned software function module is stored in a storage medium, and includes a number of instructions to make a vehicle (which may be an onboard computer, etc.) or a processor (processor) execute part of the method described in each embodiment herein.

In a further embodiment, with reference to FIG. 3, the at least one processor 32 can execute an operating device of the vehicle 3 and various installed applications (such as the driving assistant system 30), computer program codes, etc., for example, the various modules mentioned above.

Computer program codes are stored in the storage device 31, and the at least one processor 32 can call the computer program codes stored in the storage device 31 to perform related functions. For example, the various modules described in FIG. 3 are computer program codes stored in the storage device 31 and executed by the at least one processor 32, so as to realize the functions of the various modules for the purpose of providing driving assistance.

In an embodiment, the storage device 31 stores a plurality of instructions, and the plurality of instructions are executed by the at least one processor 32 to assist a driver.

Specifically, as shown in FIG. 1, the method for the at least one processor 32 to implement the above instructions includes: capture an image of a second moving vehicle when the first moving vehicle is moving; obtain basic information of the second moving vehicle according to the image of the second moving vehicle, and the basic information of the second moving vehicle comprising weight information of the second moving vehicle; obtain driving information of the first moving vehicle; determine a safe distance between the first moving vehicle and the second moving vehicle according to the driving information of the first moving vehicle and the basic information of the second moving vehicle; detect a current distance between the first moving vehicle and the second moving vehicle; and output a warning message if the current distance between the first moving vehicle and the second moving vehicle is less than the safe distance.

It should be emphasized that the above-described embodiments of the present disclosure, including any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A first moving vehicle comprising:
at least one processor, and
a storage device that stores one or more programs, which when executed by the at least one processor, causes the at least one processor to:
capture an image of a second moving vehicle;
obtain basic information of the second moving vehicle according to the captured image of the second moving vehicle, and the basic information of the second moving vehicle comprising weight information of the second moving vehicle;
obtain driving information of the first moving vehicle;
determine a safe distance between the first moving vehicle and the second moving vehicle according to the driving information of the first moving vehicle and the basic information of the second moving vehicle;
detect a distance between the first moving vehicle and the second moving vehicle;
output a warning message in response that the distance between the first moving vehicle and the second moving vehicle is less than the safe distance.

2. The first moving vehicle according to claim 1, wherein the second moving vehicle is a moving vehicle driving in front of the first moving vehicle or a moving vehicle driving behind the first moving vehicle.

3. The first moving vehicle according to claim 1, wherein obtaining basic information of the second moving vehicle according to the captured image of the second moving vehicle comprises:
identifying a license plate number of the second moving vehicle according to the captured image;
obtaining the weight information of the second moving vehicle by searching a first database according to the license plate number of the second moving vehicle, wherein the first database stores weight information of each vehicle, and a license plate number of corresponding to each vehicle.

4. The first moving vehicle according to claim 3, wherein the weight information of the second moving vehicle is a maximum load of the second moving vehicle, or the weight information of the second moving vehicle is the weight of the second moving vehicle recorded during a last weighing.

5. The first moving vehicle according to claim 1, wherein obtaining basic information of the second moving vehicle according to the captured image of the second moving vehicle comprises:
identifying a first area of the second moving vehicle and a second area of the license plate of the second moving vehicle from the captured image;
calculating a first size of the first area and a second size of the second area;
calculating a current ratio between the first size and the second size;
determining a type of the second moving vehicle according to the current ratio and obtaining the weight of the second moving vehicle according to the determined type of the second moving vehicle.

6. The first moving vehicle according to claim 5, wherein the first size is calculated through a total number of pixels in the first area, and the second size is calculated through a total number of pixels in the second area.

7. The first moving vehicle according to claim 5, wherein the at least one processor is further caused to:
pre-establish a second database, wherein the second database record a first relationship between a standard size of each type of vehicle and a standard size of the license plate of the each type of vehicle, and a second relationship between a standard size of each type of vehicle and a maximum load of the each type of vehicle.

8. The first moving vehicle according to claim 7, wherein determining a type of the second moving vehicle according to the current ratio comprises:
obtaining a plurality of standard ratios by calculating standard ratios between the standard size of each type of vehicle and the standard size of the license plate of the each type of vehicle;
determining the type of the second moving vehicle by comparing the current ratio with the standard ratios.

9. The first moving vehicle according to claim 1, wherein detecting the distance between the first moving vehicle and the second moving vehicle comprises:
detecting the distance between the first moving vehicle and the second moving vehicle by a first ultrasonic sensor or a first radar installed at the front of the first moving vehicle in response that the second moving vehicle driving in front of the first moving vehicle; and
detecting the distance between the first moving vehicle and the second moving vehicle by a second ultrasonic sensor or a second radar installed at the rear of the first moving vehicle in response that the second moving vehicle driving behind the first moving vehicle.

10. A driving assistant method applicable in a first moving vehicle, the method comprising:
capturing an image of a second moving vehicle;
obtaining basic information of the second moving vehicle according to the captured image of the second moving vehicle, and the basic information of the second moving vehicle comprising weight information of the second moving vehicle;
obtaining driving information of the first moving vehicle;
determining a safe distance between the first moving vehicle and the second moving vehicle according to the driving information of the first moving vehicle and the basic information of the second moving vehicle;
detecting a distance between the first moving vehicle and the second moving vehicle;
outputting a warning message in response that the distance between the first moving vehicle and the second moving vehicle is less than the safe distance.

11. The method according to claim 10, wherein the second moving vehicle is a moving vehicle driving in front of the first moving vehicle or a moving vehicle driving behind the first moving vehicle.

12. The method according to claim 10, wherein obtaining basic information of the second moving vehicle according to the captured image of the second moving vehicle comprises:
identifying a license plate number of the second moving vehicle according to the captured image;
obtaining the weight information of the second moving vehicle by searching a first database according to the license plate number of the second moving vehicle, wherein the first database storing weight information of each vehicle, and a license plate number of corresponding to each vehicle.

13. The method according to claim 12, wherein the weight information of the second moving vehicle is a maximum load of the second moving vehicle, or the weight information of the second moving vehicle is the weight of the second moving vehicle recorded during a last weighing.

14. The method according to claim 10, wherein obtaining basic information of the second moving vehicle according to the captured image of the second moving vehicle comprises:
identifying a first area of the second moving vehicle and a second area of the license plate of the second moving vehicle from the captured image;
calculating a first size of the first area and a second size of the second area;
calculating a current ratio between the first size and the second size;
determining a type of the second moving vehicle according to the current ratio and obtaining the weight of the second moving vehicle according to the determined type of the second moving vehicle.

15. The method according to claim 14, wherein the first size is calculated by a total number of pixels in the first area, and the second size is calculated by a total number of pixels in the second area.

16. The method according to claim 14, wherein the method further comprising:
pre-establishing a second database, wherein the second database record a first relationship between a standard size of each type of vehicle and a standard size of the license plate of the each type of vehicle, and a second relationship between a standard size of each type of vehicle and a maximum load of the each type of vehicle.

17. The method according to claim 16, wherein determining a type of the second moving vehicle according to the current ratio comprises:
obtaining a plurality of standard ratios by calculating standard ratios between the standard size of each type of vehicle and the standard size of the license plate of the each type of vehicle;
determining the type of the second moving vehicle by comparing the current ratio with the standard ratios.

18. The method according to claim 10, wherein detecting the distance between the first moving vehicle and the second moving vehicle comprises:
detecting the distance between the first moving vehicle and the second moving vehicle by a first ultrasonic sensor or a first radar installed at the front of the first moving vehicle in response that the second moving vehicle is driving in front of the first moving vehicle; and
detecting the distance between the first moving vehicle and the second moving vehicle by a second ultrasonic sensor or a second radar installed at the rear of the first moving vehicle in response that the second moving vehicle is driving behind the first moving vehicle.

19. A non-transitory storage medium having stored thereon instructions that, when executed by at least one processor of a first moving vehicle, causes the at least one processor to perform a driving assistant method, the method comprising:
capturing an image of a second moving vehicle;
obtaining basic information of the second moving vehicle according to the captured image of the second moving vehicle, and the basic information of the second moving vehicle comprising weight information of the second moving vehicle;

obtaining driving information of the first moving vehicle;

determining a safe distance between the first moving vehicle and the second moving vehicle according to the driving information of the first moving vehicle and the basic information of the second moving vehicle;

detecting a distance between the first moving vehicle and the second moving vehicle;

outputting a warning message in response that the distance between the first moving vehicle and the second moving vehicle is less than the safe distance.

20. The non-transitory storage medium according to claim 19, wherein the obtaining basic information of the second moving vehicle according to the captured image of the second moving vehicle comprising:

identifying a first area of the second moving vehicle and a second area of the license plate of the second moving vehicle from the captured image;

calculating a first size of the first area and a second size of the second area;

calculating a current ratio between the first size and the second size;

determining a type of the second moving vehicle according to the current ratio and obtaining the weight of the second moving vehicle according to the determined type of the second moving vehicle.

* * * * *